Sept. 1, 1964 P. F. WILBER 3,147,100
FILTER
Filed Jan. 15, 1962 2 Sheets-Sheet 1

INVENTOR.
PAUL F. WILBER
BY
*[signature]*
Attorney

Sept. 1, 1964  P. F. WILBER  3,147,100
FILTER
Filed Jan. 15, 1962  2 Sheets-Sheet 2

INVENTOR.
PAUL F. WILBER

United States Patent Office 3,147,100
Patented Sept. 1, 1964

3,147,100
FILTER
Paul F. Wilber, Richland, N.Y., assignor to Dollinger Corporation, Rochester, N.Y., a corporation of New York
Filed Jan. 15, 1962, Ser. No. 166,025
3 Claims. (Cl. 55—419)

This invention relates to air cleaners, and more particularly to air cleaners such as are used with automative and airplane engines that may be employed in artic or other frigid climates.

When automotive and airplane engines are operated in extremely cold climates, the temperature of the air drawn into the carburetor may be so low that it has an adverse effect upon functioning of the carburetor during both starting and running of the engine. Usually it is necessary to heat the engine up by a space heater, or from some other source in order to get it started; but even so after it is started, the engine is liable to be sluggish and operate inefficiently due to the low temperature of the air being mixed with the fuel in the carburetor.

The usual air cleaner comprises a housing having a filter unit in it, an inlet port and an exhaust port. The two ports communicate, respectively, with the atmosphere and with the engine carburetor. A major disadvantage of previous construction has been that heretofore there has been no means for controlling the temperature of the air drawn into the intake ports of the cleaners.

One object of this invention is to provide an improved air cleaner of the character described which will contribute to more efficient operation on the engine with which it is associated.

A further object of this invention is to provide an improved air cleaner of the type described which is particularly adapted to improve the cold weather operation of internal combustion engines and the like.

Another object of the invention is to provide an air cleaner or filter which will permit filtered warm air to be passed directly from a heat source into the carburetor of an engine during start up, thereby enabling quicker starts and more efficient operation.

Another object of the invention is to provide an air filter which will permit selective control over the temperature of the air drawn into the filter so as to enable cool air to be drawn from atmosphere or warm air to be drawn from a heated source, as may be desirable according to ambient atmospheric conditions.

Still another object of the invention is to provide an air filter which will permit modification of the temperature of the air drawn into it, and mixture of hot and cold air to attain a desired air temperature for delivery to a carburetor either during starting or during operation.

Other objects of the invention will be apparent hereinafter from the specification and from the recital of the appended claims, particularly when read in conjunction with the accompanying drawings.

Figure 1:
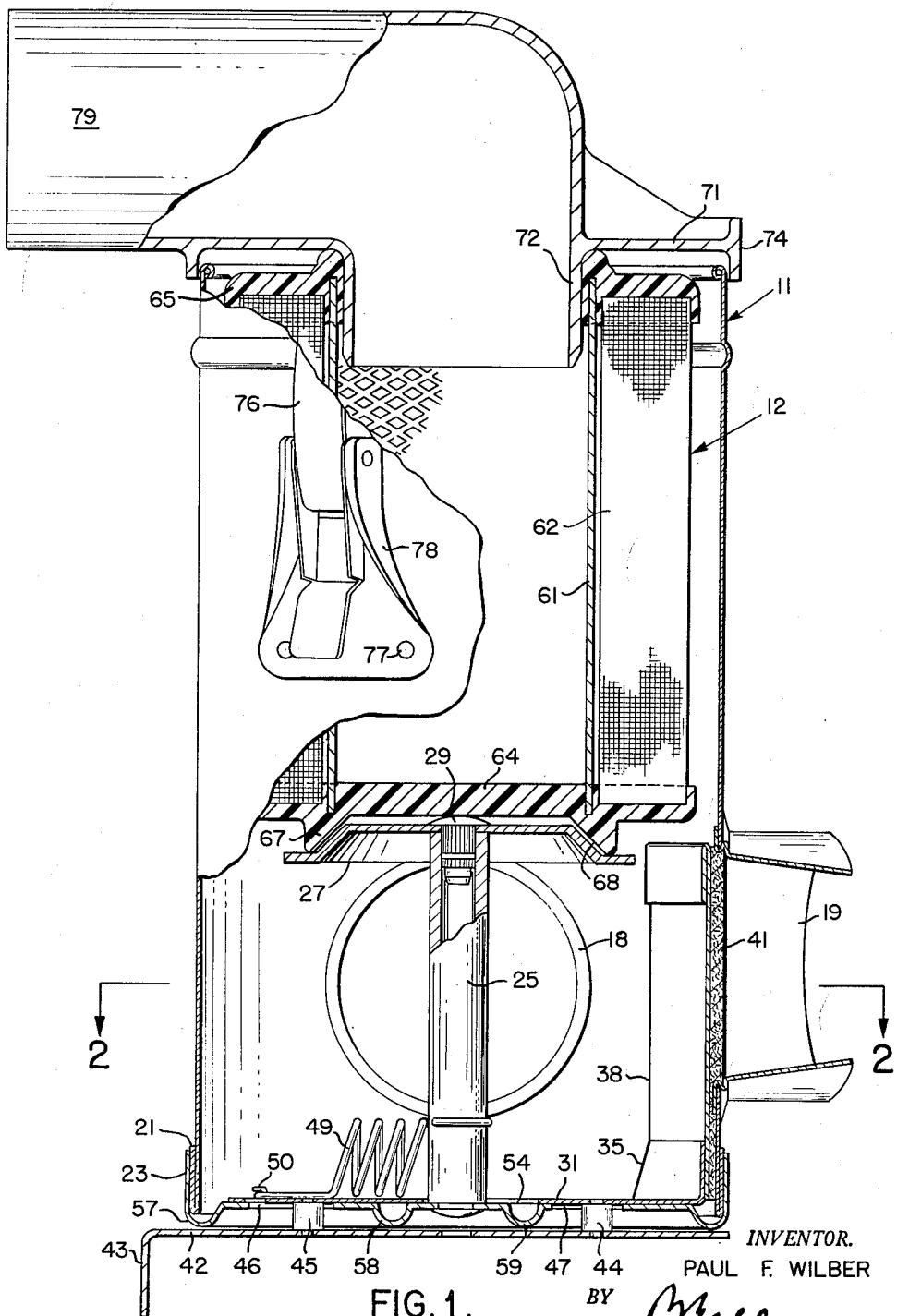
FIG. 1 is a side elevational view, partly broken away to illustrate the construction of an air cleaner built according to one embodiment of this invention.

Referring now to the drawings by numerals of reference, the novel air cleaner shown comprises a tubular housing 11 and a filter element 12. Housing 11 has two circular openings or ports in its annular wall adjacent its bottom or lower end. These are spaced apart angularly approximately 80°. Two metallic sleeves or ducts 18 and 19 are sealingly secured, each at one end in the two openings and project radially outwardly from the exterior of the housing to provide air inlet ducts for housing 11.

The lower end of the housing, which is here made of sheet metal, is folded upon itself to provide a reinforcing collar 21. A shallow, cup-shaped cap 23 is press fit or otherwise snugly secured over the lower end of collar 21. Secured at one end to the cap 23, centrally thereof, and projecting axially upwardly from the cap into the interior of the housing coaxially thereof, is a tubular post 25. Post 25 has an inverted, dish-shaped plate 27 riveted to its upper end by a rivet 29 of the type having a knurled shank.

The filter element 12 is mounted on the plate or platform 27 as will be described further hereinafter. The filter element may be of any usual or suitable construction. That shown is of the type disclosed in my Patent No. 2,962,121, granted November 29, 1960. Air entering the housing 11 through either duct 18 or 19 will pass through the filter element 12 and out through an outlet duct 72 which is formed in the cover 71 for the housing.

One of the ducts 18, 19, is connected to a source of heated air; and the other of these two ducts is connected to atmosphere or other source of cool air. The present filter is provided with means for selectively connecting the heated air duct or the cool air duct to the filter element, and also for blending the streams of hot and cold air flowing from those ducts into the housing. The means for control of this inflowing air will now be described.

Rotatably and slidably mounted on the upper face of cap 23, and surrounding the bottom end of post 25, is a sheet metal plate 31. Plate 31 has an arcuate marginal flange or lip 35 which projects upwardly. Marginal portions of pivot plate 31 are slabbed off at opposite ends of the arcuate flange 35 as denoted at 34 for strength and lightness. An arcuate sheet metal baffle 38, which has an angular width greater than the diameters of the ports in the housing 11 for ducts 18 and 19, is welded or otherwise secured to the outer, convex surface of arcuate lip 35 to project upwardly thereabove. Secured by an appropriate adhesive to the outer convex surface of baffle 38 is a resilient layer or pad of fibrous insulation 41 of Fiberglas or the like.

Figure 2:
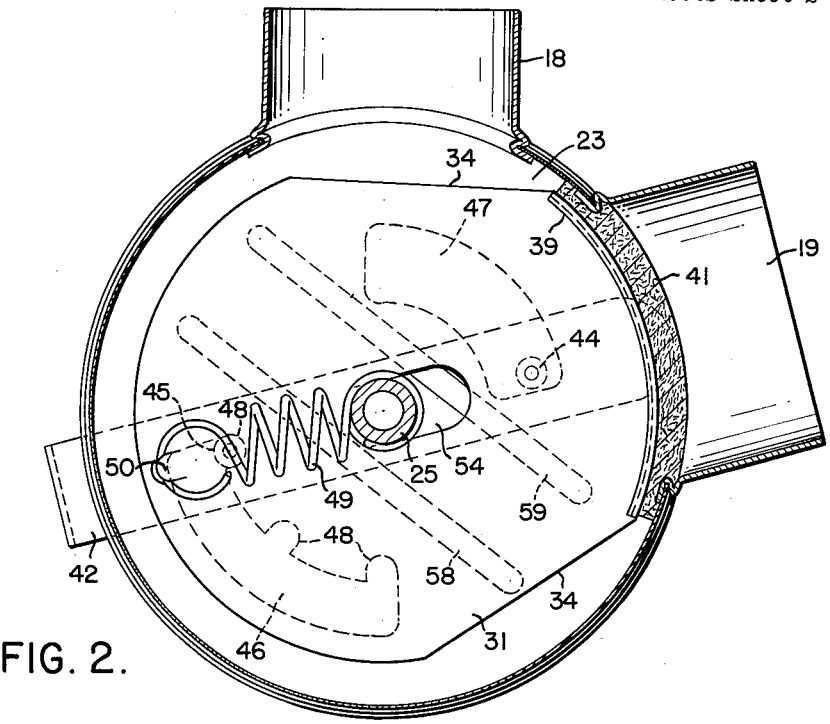
FIG. 2 is a sectional view taken along the line 2—2 in FIG. 1 looking in the direction of the arrows.
Figure 3:
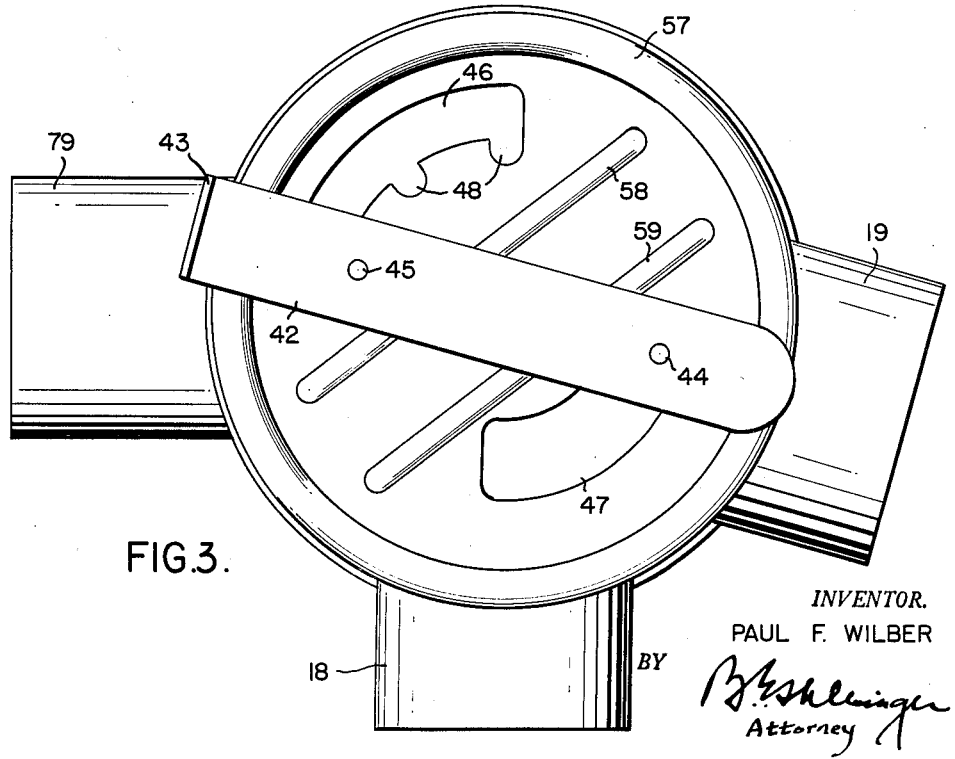
FIG. 3 is a bottom view of this cleaner.

For adjusting the position of the baffle, a metal strap 42 having a downwardly bent handle portion 43 at one end thereof is secured to the plate 31 outside housing 11 below cap 23 by rivets that are surrounded by cylindrical spacers 44 and 45. These spacers extend through arcuate slots 47 and 46, respectively, in cap 23 (FIG. 2). A tension spring 49, which is connected at one end to post 25 and at its opposite end to a lug 50 struck up from plate 31 adjacent its marginal edge, serves to bias the baffle into engagement with the inside of the side wall of the housing. The baffle is held selectively in each of its three possible angular positions, namely, in registry with and closing duct 18, in registry with and closing duct 19, and part-way across both ducts, by the spacer 45 when seated in one of three angularly spaced notches 48 formed in the radially inner edge of slot 46. To adjust the baffle position, handle 43 is pulled. To permit this movement, plate 31 is provided with an elongate slot 54 through which post 25 passes, and cap 23 is provided with the slots 46 and 47. When spacer 45 seats in the notch 48 which is located midway between the ends of slot 46, neither duct 18 or 19 is completely blocked and sealed by the baffle; but both are open. When the spacer 45 is one of the end notches 48, duct 18 is closed. When it is in the other end notch 48, duct 19 is closed. The cap 23 is formed on its outside face with a marginal, circular boss 57 and two linear bosses 58 and 59 at opposite sides, respectively, of post 25. Bosses 57, 58 and 59 project axially beyond the slotted portions of cap 23 and into engagement with the inner face of adjusting strap 42 to maintain plate 31 flush against cap 23, thereby minimizing frictional drag on strap 42 and plate 31.

As stated above, the filter element 12 (FIG. 1) employed in the filter of this invention is similar to that disclosed in my U.S. Patent No. 2,962,121. It comprises an inner cylindrical screen 61 of finely woven wire which is surrounded by a woven wire screen 62 that is formed with radially-directed and axially-extending filter cloth-covered pleats (not illustrated); and opposite ends of screens 61 and 62 are embedded in molded, elastomeric end gaps 64 and 65, respectively. Here end cap 64 is solid and is formed on its lower face with an axially projecting circular boss 67 having a frusto-conical inner surface 68 which is adapted to be seated coaxially upon, and to sealingly engage the confronting face of the inverted, dish-shaped supporting platform 27. The end cap 65 at the opposite end of filter 12 has an axial bore aligned with the bore of screen 61.

The exhaust duct 72 in cover 71 of housing 11 extends axially beyond the inner face of the cover and is adapted to be inserted snugly into the axial bore of end cap 65 when cover 71 is positioned over the top of the housing as shown in FIG. 1. Cover 71 has a circular, marginal flange 74 which is adapted to project downwardly about the open end of the housing; and gasket material may be interposed between flange 74 and the upper, open end of the housing to provide an effective seal between cover 71 and the open end of the housing. Conventional toggle clamps, one of which is shown at 76 in FIG. 1, and which are pivoted on brackets 78 that are secured by rivets 77 to the exterior of the housing, serve to releasably retain cover 71 over the top of the housing.

In operation, filter element 12 is adapted to be mounted in housing 11 as shown in FIG. 1 so that air or other fluid may enter, through one or other or both of the inlet ducts 18 and 19 into the radial space between the filter element and the housing and pass therefrom radially inwardly through the filter element to the outlet duct 72 and thence to the carburetor or other device which happens to be connected to the outlet end 79 of the duct 72. When the invention is employed in conjunction with a carburetor for an internal combustion engine and the outside air is cold, the air entering the filter housing through duct 18, may be pre-heated by a blowtorch or the like before it enters filter housing 11. This will enable easy starting of the engine without having to heat any great volume of air. The inlet end of this duct 18 may be disposed close to the engine, or to the engine exhaust pipe so that, after the engine is started and warmed up, heated air will continue to flow into the filter housing, and thence to the carburetor. The duct 19 is intended to receive air at ambient temperature from the atmosphere surrounding the engine. In extremely cold weather, then, damper 38 may be disposed in the position shown in FIG. 2 so that it prevents the cold ambient air from entering the filter and permits heated air to be drawn thereinto. The incoming heated air permits the carburetor to function properly even in ambient temperatures as low as from 30° F. to 60° F. below zero.

In warmer weather, plate 31 may be shifted counter-clockwise from its position in FIG. 2 by pulling on handle 43 to disengage spacer 45 from that notch 48 of slot 46, with which it has previously been engaged, and to position it in line with the notch 48 at the opposite end of slot 46. Handle 43 is then released; and spring 49 causes plate 31 to shift relative to cap 23 to engage the spacer 45 with this latter notch 48 and to simultaneously urge the baffle 38 into sealing engagement with the duct 18. Spring 49 maintains the spacer 45 in notch 48 so that spacer 45 and post 25 cooperate to prevent accidental shifting of plate 31 relative to cap 23. If it is desired to blend the air from both ducts 18 and 19, plate 31 is shifted until spacer 45 is positioned in the middle notch 48 so that baffle 38 will partly cover both inlet ducts 18 and 19 (see FIG. 2).

It will be understood that by provision of additional notches 48 intermediate the shown central notch 48 (FIG. 2) and the end notches 48, different ratios of hot and cold air may be drawn into the filter, that is, more precise control over the temperature of the air entering the filter can be achieved.

Furthermore, although this invention has been described in connection with a filter for an internal combustion engine, it is to be understood that my novel air cleaner may be employed in any instance wherein it is desirable to selectively control one or more sources of a fluid which is to be filtered, regardless of the particular use for which the filtered fluid is to be employed.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A filter comprising
   (a) a hollow, generally cylindrical housing having
   (b) a fluid exhaust port adjacent one end thereof and
   (c) at least two angularly spaced fluid inlet ports in the side of said housing adjacent the opposite end thereof,
   (d) a filter element having a bore and a generally porous, annular side wall surrounding said bore,
   (e) means mounting said element in said housing with the exterior of said wall in communication with said inlet ports and with said bore in communication with said exhaust port,
   (f) a plate mounted in said housing adjacent said opposite end thereof for radial and angular movement relative to the axis of said housing in a plane extending transverse to the axis of said housing,
   (g) an arcuate baffle member secured to the marginal edge of said plate and extending axially of said housing and transverse to said inlet ports,
   (h) manually operable adjusting means on the exterior of said housing connected to said plate for moving said plate relative to said housing radially and angularly into different radial and angular adjusted positions, said plate being operative upon movement thereof to one position to shift said baffle into alignment with one of said inlet ports, and upon movement thereof to a different angular position to shift said baffle into alignment with the other of said inlet ports, and
   (i) resilient means on said baffle member operative to seal a respective port when said baffle member is aligned with that port.
2. A filter as defined in claim 1 wherein the first-named means includes
   (a) a post secured at one end to said opposite housing end and extending axially into said housing and through an opening in the center of said plate to support said filter element in a stationary position in said housing, and wherein said adjusting means comprises
   (b) a rigid member which extends across the bottom of said housing, and
   (c) two spaced pins for securing said plate to said rigid member and which extend, respectively, axially through one of
   (d) two arcuate slots formed in said opposite housing end at opposite sides of said post, each of said two slots being disposed concentrically about said post and having an arcuate length sufficient to permit said rigid member and plate secured thereto to be pivoted about said post to said different, adjusted, plate positions.

3. A filter as defined in claim 2 wherein said opening in said plate and said slots in said opposite housing end permit slight radial shifting of said plate relative to the side of said housing, and wherein said axially extending baffle member has (a) a convexedly shaped surface which is congruent with the inner face of the side of said housing and to which said resilient means is secured, and (b) a spring connected to said plate and constantly urging said plate and baffle member thereon in a radial direction so that said resilient means tends to engage and seal the inner face of the side of said housing.

References Cited in the file of this patent

UNITED STATES PATENTS

| | | |
|---|---|---|
| 2,788,086 | Sebok | Apr. 9, 1957 |
| 2,962,121 | Wilber | Nov. 29, 1960 |
| 2,987,138 | Walton | June 6, 1961 |

FOREIGN PATENTS

| | | |
|---|---|---|
| 62,272 | Denmark | May 22, 1944 |
| 1,134,856 | France | Dec. 10, 1956 |